United States Patent [19]
Yeomans

[11] Patent Number: 6,134,680
[45] Date of Patent: Oct. 17, 2000

[54] ERROR HANDLER FOR A PROXY SERVER COMPUTER SYSTEM

[75] Inventor: Andrew James Victor Yeomans, Tring, United Kingdom

[73] Assignee: International Business Machines Corp, Armonk, N.Y.

[21] Appl. No.: 09/102,501

[22] Filed: Jun. 22, 1998

[30] Foreign Application Priority Data

Oct. 16, 1997 [GB] United Kingdom .................... 9721836

[51] Int. Cl.[7] ....................................................... G06F 11/32
[52] U.S. Cl. ............................................. 714/57; 709/219
[58] Field of Search ................................... 714/48, 57, 4; 709/219, 239, 217, 244, 250

[56] References Cited

U.S. PATENT DOCUMENTS 5,812,769  9/1998  Graber et al. ...................... 395/200.12
5,907,680  5/1999  Nielsen ............................. 395/200.58
6,012,086  1/2000  Lowell ..................................... 709/218
6,041,324  3/2000  Earl et al. ..................................... 707/9

OTHER PUBLICATIONS

"World Wide Web and HTML" by Douglas C. McArthur, p. 18–26 in Dr Dobbs Journal, Dec. 1994.

*Primary Examiner*—Robert W. Beausoliel, Jr.
*Assistant Examiner*—Scott T. Baderman
*Attorney, Agent, or Firm*—A. Bruce Clay

[57] ABSTRACT

An error handler for a proxy server computer system receives a universal resource locator from a remote user terminal, accesses from a computer network a data file identified by the universal resource locator for supply to the user terminal, automatically modifies the universal resource locator in response to detection of a failure by the accessing means to access the data file, determines if a data file identified by the modified universal resource locator is accessible to the user terminal, and returns variable data indicating the error and offering remedial options to the user.

11 Claims, 6 Drawing Sheets

ERROR HANDLER FOR A PROXY SERVER COMPUTER SYSTEM

TECHNICAL FIELD

The present invention relates to an error handler for a proxy server computer system.

BACKGROUND ART

A typical data communication network comprises a user terminal connected to the Internet via a proxy server computer system. The proxy server acts as gateway through which the user terminal can communicate with one or more remote server computer systems also connected to the Internet.

In recent years, there has been explosive growth in the Internet, and in particular of the WorldWide Web (WWW), which is one of the facilities provided via the Internet. The WWW comprises many pages or files of information, distributed across many different remote servers. Each page is identified by an individual address or "Universal Resource Locator (URL)". Each URL denotes a protocol, a remote server, and a particular file or page on that remote server. There may be many pages or URLs resident on a single remote server.

Typically, to utilise the WWW, a user runs a computer program called a Web browser on a user terminal such as a personal computer system. Examples of widely available Web browsers include the "WebExplorer" Web browser provided by International Business Machines Corporation in the OS/2 Operating System software, or the "Navigator" Web browser available from Netscape Communications Corporation. The user interacts with the Web browser to select a particular URL. The interaction causes the browser to send a request for the page or file identified in the selected URL to the server identified in the selected URL. Typically, the remote server responds to the request by retrieving the requested page, and transmitting the data for that page back to the requesting user terminal. The client-server interaction between the user terminal and the remote server is usually performed in accordance with a protocol called the hypertext transfer protocol ("http"). The page received by the user terminal is then displayed to the user on a display screen of the client. The client may also cause the server to launch an application, for example to search for WWW pages relating to particular topics.

WWW pages are typically formatted in accordance with a computer programming language known as hypertext markup language ("HTML"). Thus a typically WWW page includes text together with embedded formatting commands, referred to as tags, that can be employed to control for example font style, font size, lay-out etc. The Web browser parses the HTML script in order to display the text in accordance with the specified format. In addition, an HTML page also contain a reference, in terms of another URL, to a portion of multimedia data such as an image, video segment, or audio file. The Web Browser responds to such a reference by retrieving and displaying or playing the multimedia data. Alternatively, the multimedia data may reside on its own WWW page, without surrounding HTML text.

Most WWW pages also contain one or more references to other WWW pages, which need not reside on the same server as the original page. Such references may be activated by the user selecting particular locations on the screen, typically by clicking a mouse control button. These references or locations are known as hyperlinks, and are typically flagged by the Web browser in a particular manner. For example, any text associated with a hyperlink may be displayed in a different colour. If a user selects the hyperlinked text, then the referenced page is retrieved and replaces the currently displayed page.

Further information about HTML and the WWW can be found in "World Wide Web and HTML" by Douglas McArthur, pp 18–26 in Dr Dobbs Journal, December 1994, and in "The HTML SourceBook" by Ian Graham, John Wiley, New York, 1995.

A problem associated with accessing www pages is that, in the event of a communications error between the user terminal and the remote server, the user is typically presented with a error message from which it is usually difficult for a lay person to understand the nature of the error. Particularly preferred embodiments of the present invention provide a solution to this problem of providing the user with error messages which are relatively easy to understand.

SUMMARY OF THE INVENTION

In accordance with the present invention, there is now provided an error handler for a proxy server computer system, the error handler comprising: means for receiving a universal resource locator from a remote user terminal; means for accessing from a computer network a data file identified by the universal resource locator for supply to the user terminal; means for automatically modifying the universal resource locator in response to detection of a failure by the accessing means to access the data file; and, means for determining if a data file identified by the modified universal resource locator is accessible to the user terminal.

In the event of an error in a WWW page access, by identifying alternative WWW pages, an error handler of the present invention enables automatic presentation to the user of alternative WWW pages on the basis of the URL originally submitted.

Preferably, the error handler comprises means for reporting to the user terminal that data file identified by the modified universal resource identifier is accessible. The error handler may also comprise a protocol store storing a plurality of protocols for insertion in the universal resource locator. Furthermore, the error handler may comprise a server name store storing a plurality of server names for insertion in the universal resource locator. Additionally, the error handler may comprise a file extension store storing a plurality of file extensions for insertion in the universal resource locator.

It will be appreciated that the present invention extends to a proxy server computer system comprising: memory means; a central processing unit; first network adapter means for connecting the proxy server to a remote user terminal; second network adapter means for connecting the proxy server to a network of server computer systems; a bus architecture interconnecting the memory means and the central processing unit, the first network adapter means and the second network adapter means, and an error handler as hereinbefore described.

Viewing the present invention from another aspect there is now provided a method for handling errors in a proxy server computer system comprising: receiving a universal resource locator from a remote user terminal; accessing from a computer network a data file identified by the universal resource locator for supply to the user terminal; automatically modifying the universal resource locator in response to detection of a failure by the accessing means to access the data file; and, determining if a data file identified by the modified universal resource locator is accessible to the user terminal.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENT

Figure 1:
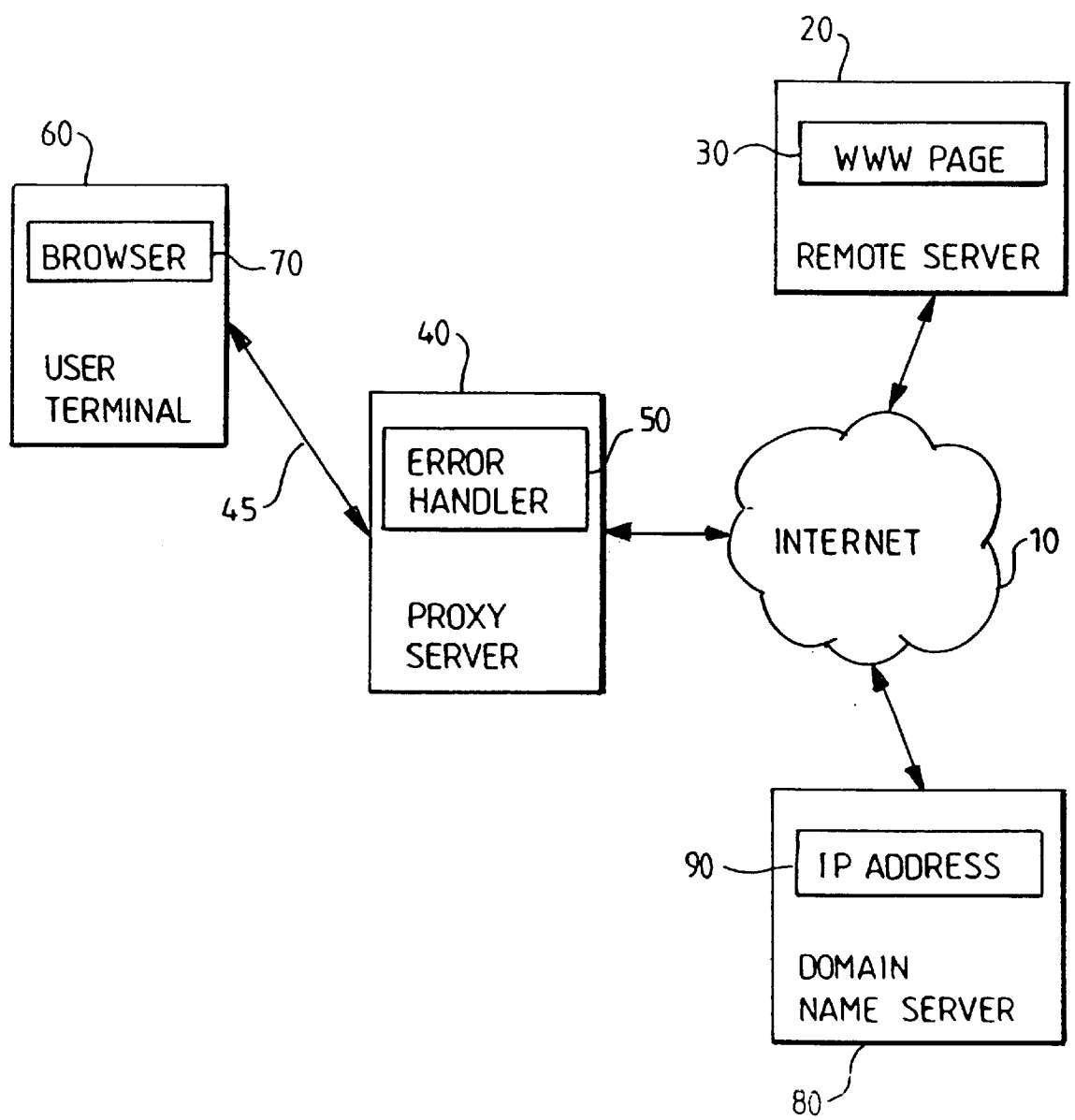
FIG. 1 is a block diagram of a data communication network.

Referring first to FIG. 1, a data communication network embodying the present invention comprises the Internet 10. Connected to the internet 10 is a remote server computer system 20. Stored in the remote server 20 is a WWW page 30. A proxy server computer system 40 is also connected to the internet 10. Connected to the proxy server computer system via an intranet connection 45 is a user terminal 60. Stored in the user terminal 60 is web browser 70 software, such as "Netscape Navigator" or "IBM WebExplorer" web browser products, for enabling the user terminal to access the WWW page 30 residing on the remote server 20 via the proxy server 40 and the internet 10. In accordance with the present invention, the proxy server 40 includes an error handler 50. The error handler 50 will be described in detail shortly. A domain name server 80 is also connected to the internet 10. Stored in the name server 80 is the Internet Protocol (IP) address of the remote server 20.

Figure 2:
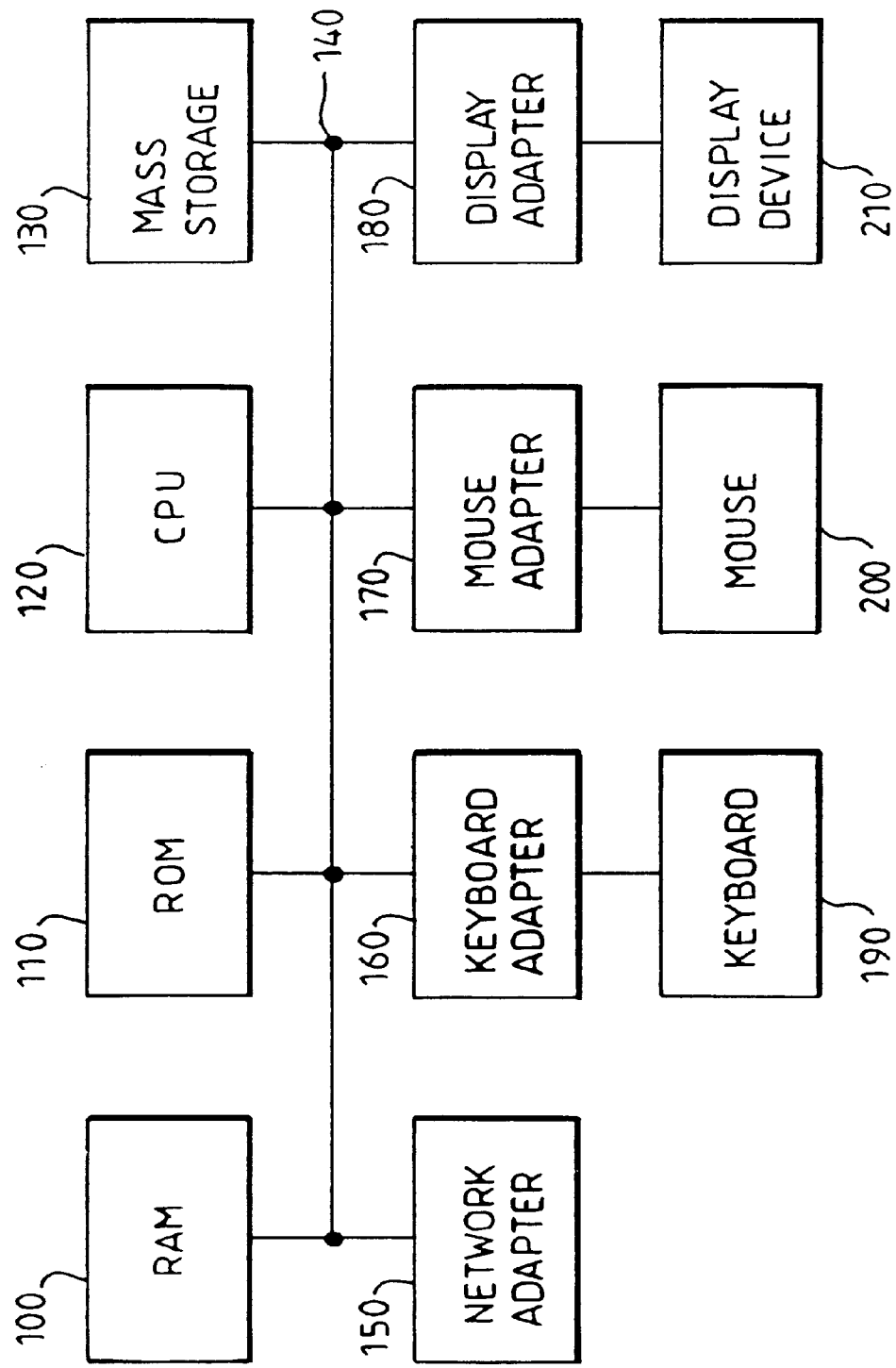
FIG. 2 is a block diagram of a user terminal of the data communications network.

Referring now to FIG. 2, the user terminal 60 comprises a random access memory (RAM) 100, a read only memory (ROM) 110, a central processing unit (CPU) 120, a mass storage device 130 comprising one or more large capacity magnetic disks or similar data recording media, a network adaptor 150, a keyboard adaptor 160, a pointing device adaptor 170, and a display adaptor 180 all interconnected via a bus architecture 140. A keyboard 190 is coupled to the bus architecture 140 via the keyboard adaptor 160. Similarly, a pointing device 200, such as a mouse, touch screen, tablet, tracker ball or the like, is coupled to the bus architecture 140 via the pointing device adaptor 170. Equally, a display output device 210, such as a cathode ray tube (CRT) display, liquid crystal display (LCD) panel, or the like, is coupled to the bus architecture 140 via the display adaptor 180. The bus architecture 140 is additionally coupled to the proxy server via the network adapter 150.

Basic input output system (BIOS) software is stored in the ROM 110 for enabling data communications between the CPU 130, mass storage 130, RAM 100, ROM 110, and the adaptors 150–180 via the bus architecture 140. Stored on the mass storage device 130 is operating system software and application software. The operating system software cooperates with the BIOS software in permitting control of the user terminal 60 by the application software. The application software includes the web browser 70. In operation, a user of the user terminal 60 wishing to access the WWW page 30 stored on remote server 20 via the internet, selects the web browser 70 via the operating system software. In response to such selection, the user terminal 60 retrieves the browser 70 from the mass storage 130, loads it into the RAM 100, and executes it via the CPU 120.

It will be appreciated that the proxy server 40, the domain name server 80, and the remote server 20 may each comprise similar hardware, BIOS, and operating system components to those of the user terminal 60.

Figure 3:
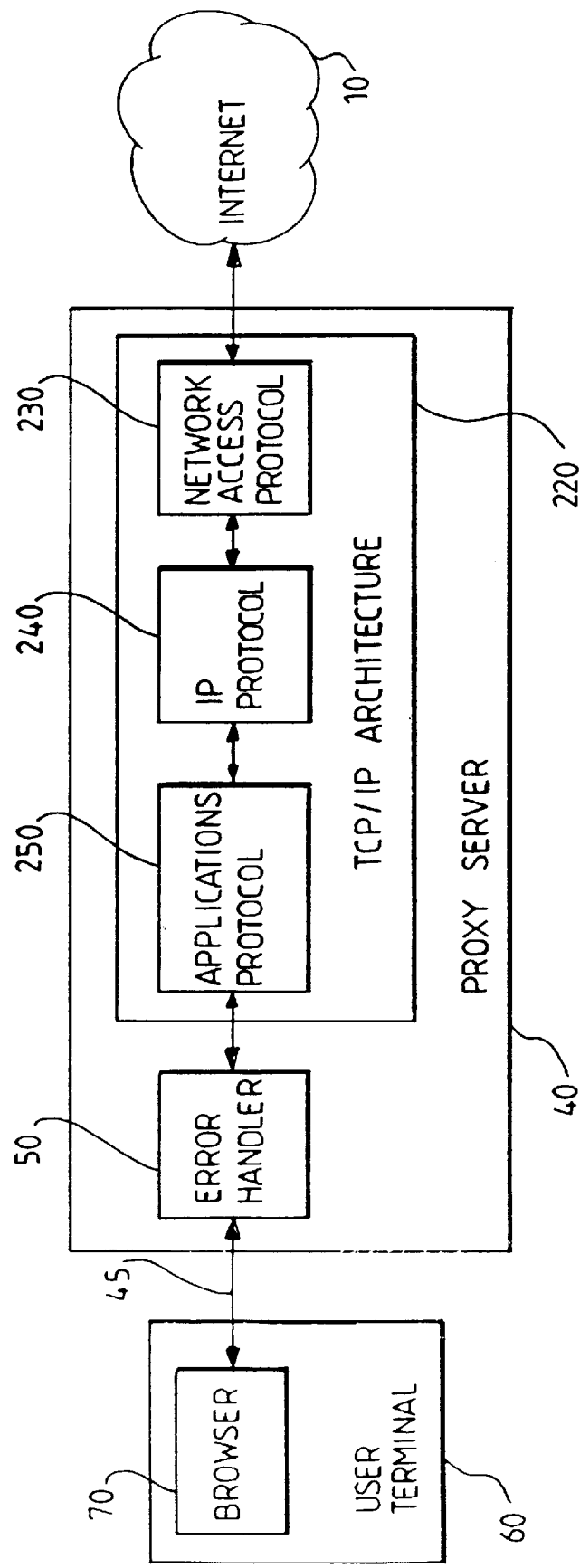
FIG. 3 is another block diagram of a proxy server computer system of the data communications network.

Referring now to FIG. 3, the proxy server 40 comprises a Transmission Control Protocol/Internet Protocol (TCP/IP) architecture 220 for transferring messages between the browser 70 in the user terminal 60 and the Internet 10. The TCP/IP architecture 220 comprises an applications layer 250, an Internet Protocol (IP) layer 240, and a network access protocol layer 230. The applications layer 250 comprises a plurality of applications protocols for providing data transfer services to the remote user terminal 60. The applications protocols may comprise one or more of Hypertext Transfer Protocol (http), File Transfer Protocol (ftp), Network Terminal Protocol (TELNET), and Simple Mail Transfer Protocol (SMTP), for example. All data passing through the proxy server 40 passes through the IP layer 240. The IP layer 240 delivers data from the applications layer 250 to the correct network connection in the network access protocol layer 230. The IP layer 240 further delivers data from the Internet 10 to the correct applications protocol in the applications layer 250. The network access protocol layer 230 comprises a plurality of network access protocols such as X.25 or Ethernet for communicating data to and from the Internet 10. Functionally, the error handler 50 resides in the proxy server 40 between the applications layer 250 and the browser 70 in the user terminal 60. All data passing between the browser 70 and the IP layer 240 passes through the error handler 50.

In operation, a user desiring to access the WWW page stored in the remote server 20 interacts with the browser 70 on the user terminal 60 to select the Universal Resource Locator (URL) (eg: http://www.xyz.com/page) associated the WWW page 30. The interaction causes the browser 70 to send to the proxy server 40 a text message requesting the WWW page 30 in terms of the associated URL (eg: Get http://www.xyz.com/page). The proxy server 40 splits the URL received in the text message into three sections:

1) http:,
2) www.xyz.com, and,
3) /page

The proxy server 40 next sends, via the internet 10, section 2) of the URL (www.xyz.com) to the domain name server 80. In response to the received section of the URL, the domain name server 80 returns to the proxy server 40 the IP address 90 identifying the remote server 20 on the internet 10. On receipt of the IP address 90 from the domain name server 80, the proxy server 40 sends a TCP request based on the IP address requesting the remote server 30 to provide the WWW page 30 specified in section 3) of the URL (eg: /page). If no errors occur, the remote server 20 responds to the request by retrieving the requested WWW page 30, and transmitting the data for that page back to the user terminal 60 via the Internet 10 and the proxy server 40. The page 30 received by the user terminal 60 is then displayed to the user on a display screen 210 of the user terminal 60.

It will be appreciated that, in some embodiments of the present invention, the domain name server 80 may comprise a plurality server computer systems each connected to the internet and collectively performing the function of the domain name server 80 described herein.

Figure 4:
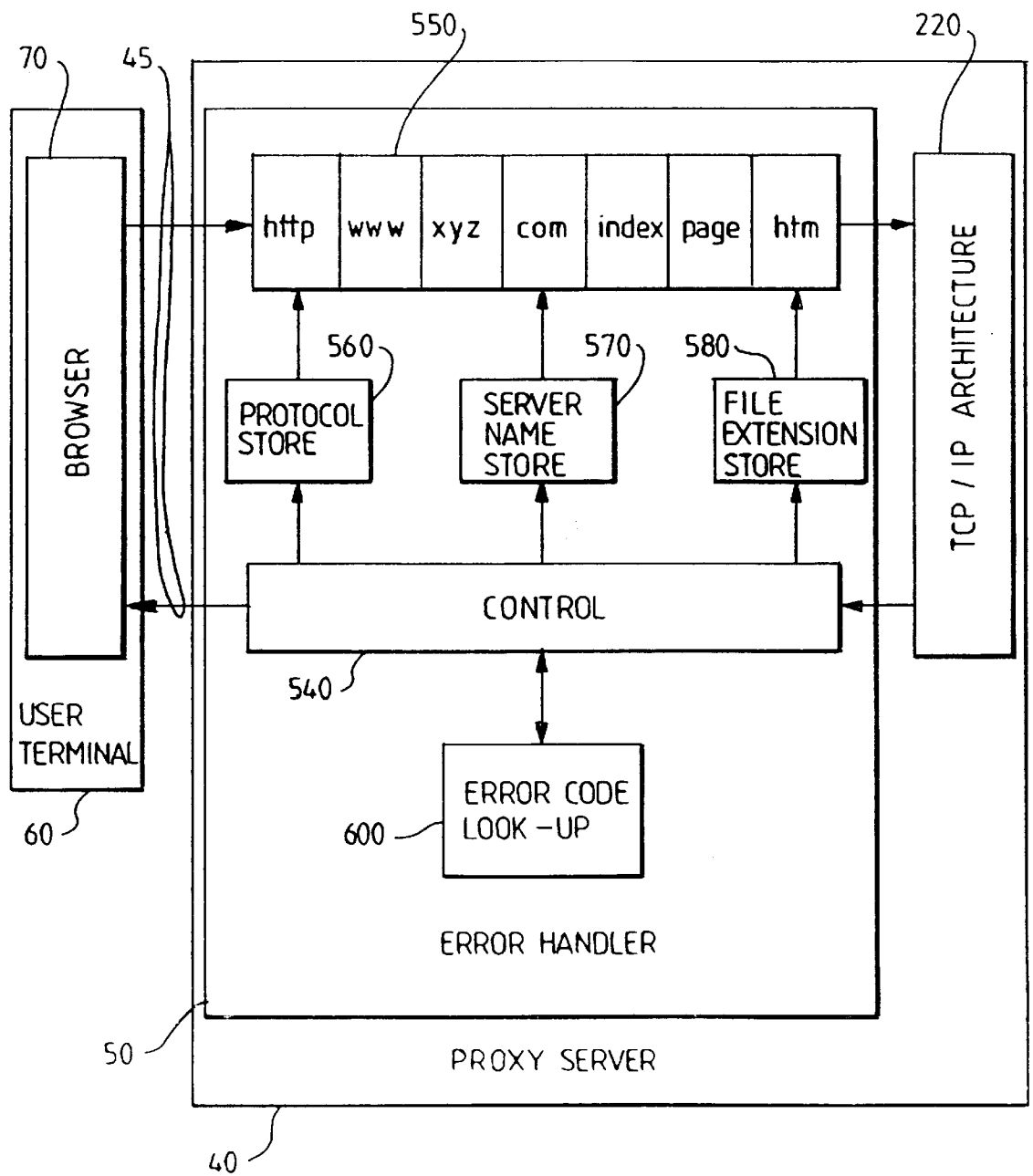
FIG. 4 is a block diagram of an error handler of the proxy server computer system.

Referring now to FIG. 4, the error handler 50 comprises: a protocol store 560 storing a set of alternative protocols for insertion into the URL 550 received from the browser 70; a server name store 570 storing a set of alternative server names for insertion into the URL 550 received from the browser; and, a file extension store 580 storing a set of alternative file extensions for insertion into the URL 550 received from the browser 70. Control logic 590 is connected to the protocol, server name and file extension stores 560–580 to control insertion of alternatives from the protocol, server name and file extension stores 560–580 into the URL 550. In particularly preferred embodiments of the invention the control logic 590 is implemented by computer program code executing on the CPU of the proxy server 40. An error code look up table 600 is also connected to the control logic 590. In preferred embodiments of the present invention, the stores 560–580 and the look up table 600 are kept in the mass storage of the proxy server 40 until the error handler 50 is invoked whereupon the stores and 560–580 and the look up table are transferred to the RAM of the proxy server 40.

The operation of the error handler 50 in the proxy server 40 will now be described with reference to FIGS. 5 and 6.

Figure 5:
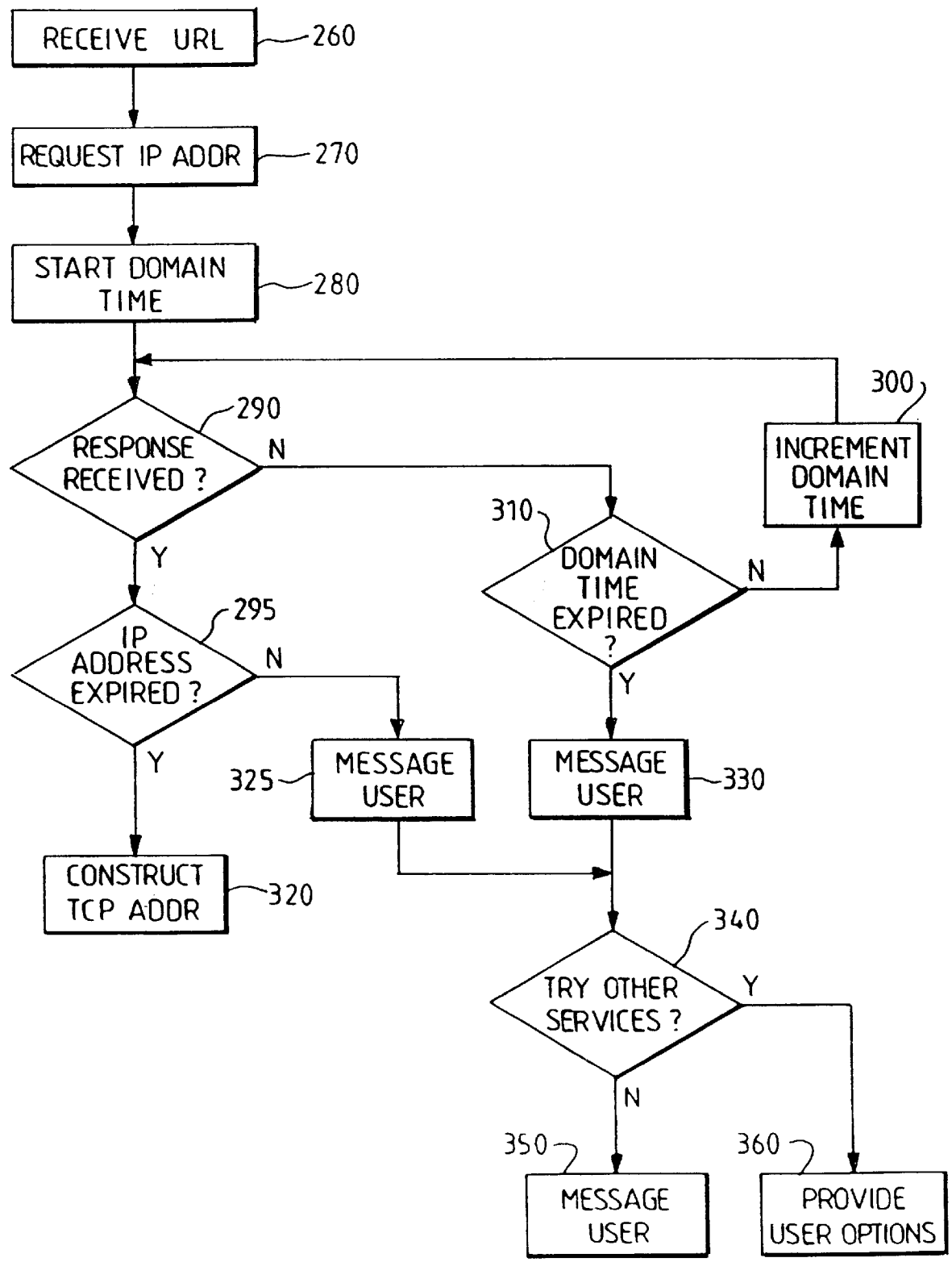
FIG. 5 is a flow diagram relating to a first part of the error handler.

Referring first to FIG. 5, as described earlier, all communications between the user terminal 60 and the remote server 20 are passed through the error handler 50 in the proxy server 40. At 260, the proxy server 40 receives the URL 550 from the browser 70. At 270, the proxy server 40 sends a request to the domain name server 80 for the IP address 90 corresponding to the URL 550. At 280, the control logic 590 starts a domain time count. At 290, the control logic 590 determines whether a response has been received by the proxy server 40. If a response has been received then, at 295, the control logic 590 determines whether the IP address has been received by the proxy server 40 from the domain name server 80. If the IP address has been received then, at 320, the proxy server 40 constructs a TCP request for requesting the WWW page 30 from the remote server 20. If the IP address has not been received then, at 325, the proxy server sends a "Host not found" text message back to the bowser 70 for display to the user and then proceeds to 340.

If, at 290, a response has not been received then, at 310, the control logic 590 determines whether the domain time count exceeds a predetermined threshold. In some embodiments of the present invention, the predetermined threshold tested at block 290 may be set by administration staff responsible for the proxy server 40. If the domain time is less than the predetermined threshold then, at 300, the control logic 590 increments the domain time and tests again, at 290, for receipt of the IP address 90 from the domain name server 80. If the domain time exceeds the predetermined threshold then, at 330, the control logic 590, sends a "No response" text message back to the browser 70 for display to the user.

At 340, the control logic 590 requests the domain name server 80 to return any IP addresses corresponding to server names which are similar to the server name specified in the URL 550 from the browser 70 (eg: www.xyz.int, www.xyz.org, etc.). The alternative server names are stored in the server name store 570 for insertion in the URL 550 by the control logic 590. In some embodiments of the present invention, the alternative server names are found by requesting a domain name server to provide an entire domain and then selecting similar names. Furthermore, in some embodiments of the present invention, the alternative server names are provided by examining recently accessed URLs from similar names. If the domain name server 80 fails to provide IP addresses corresponding to such similar names then, at 350, the control logic 590 sends a corresponding text message back to the browser 70 for display to the user (eg: "Unable to find any server names similar to www.xyz.com"). If the domain name server 80 returns IP addresses corresponding to the similar server names suggested by the control logic 590, then, at 360, the control logic 590 sends a text message back to the browser 70 for display to the user listing the available similar server names as hypertext links from which the user can select an alternative destination for the WWW page request.

In some preferred embodiments of he present invention, before seeking the IP addresses of alternative servers, the control logic 590 may send multiple cascaded messages to the browser 70 each indicating that the remote server 20 specified has yet to be found (eg: "Have not found www.xyz.com yet" . . . "Still have not found www.xyz.com").

Figure 6:
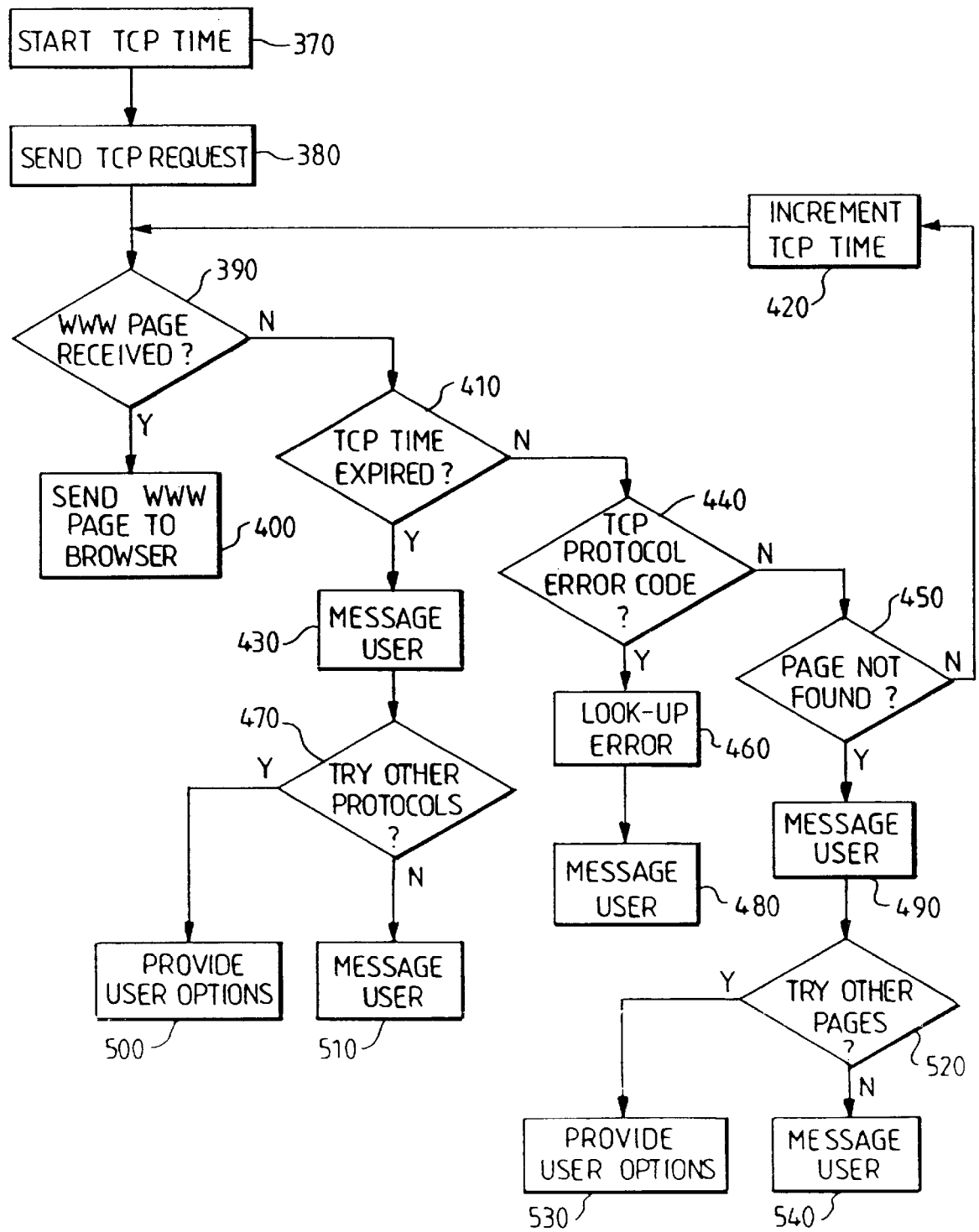
FIG. 6 is a flow diagram of relating to a second part of the error handler.

Referring now to FIG. 6, on receipt by the proxy server 40 of the IP address corresponding to the remote server 20, the control logic 590 starts a TCP time count. At 380, as hereinbefore described, the proxy server 40 sends a TCP request to the remote server 30 specified by the IP address for the WWW page 30 specified in the URL. At 390, the control logic 590 determines if the WWW page 30 has been received by the proxy server 40. If the WWW page 30 has been received by the proxy server 40, then, at 400, the WWW page 30 is forwarded to the browser 70 for display to the user. If the WWW page 30 has not been received then, at 410, the control logic 590 determines if the TCP time count exceeds a predetermined threshold. Once again, in preferred embodiments of the present invention, the predetermined threshold tested at 410 may be set by administration staff responsible for the proxy server 40. If the TCP time count is less than the predetermined threshold then, at 440, the control logic 590 determines if a TCP protocol error code has been received by the proxy server 40 from an networking device, such as a router for example, within the internet 10 between the remote server 20 and the proxy server 40. If the control logic 590 determines that no such error code has been received by the proxy server 40 then, at 450, the control logic 590 determines if the remote server 30 has responded to the proxy server 40 with an error message such as "page not found". If the control logic 590 determines that no such "page not found" message has been received by the proxy server 40 from the remote server 20 then, at 420, the control logic 590 increments the TCP time count and tests again, at 390, for arrival of the WWW page 30 at the proxy server 40.

If, at 410, the control logic 590 determines that the TCP time count exceeds the predetermined threshold then, at 430, the control logic 590 send a message to the browser 70 for display to the user to indicate a protocol error (eg: "Cannot reach http://www.xyz.com"). At 470, the error handler tries to reach www.xyz.com via alternative protocols (eg: echo or ftp) stored in the protocol store 560. If, at 470, the control logic 590 fails to reach www.xyz.com via such alternative protocols then, at 510, the control logic 590 sends a corresponding text message back to the browser 70 for display to the user (eg: "Unable to find a protocol for contacting www.xyz.com—server probably not running"). If, at 470, the control logic 590 makes contact with www.xyz.com via one or more alternative protocols then, at 510, the control logic 590 sends a text message back to the browser 70 for display to the user listing the available protocols for contacting www.xyz.com as hypertext links from which the user can select an alternative destination for the WWW page request.

If, at 440, the control logic 590 receives an error code from, for example, an intermediate device on the internet 10 then, at 460, the control logic 590 retrieves a corresponding text message from the error code look up table 600 and sends it, at 480, to the browser 70 for display to the user.

If, at 450, the control logic 590 receives a page not found error from the remote server 30 then, at 490, the control logic 590 sends a text message to the browser 70 for display to the user to indicate that the remote server 30 cannot find the requested page (eg: "www.xyz.com cannot find/page"). At 520, the control logic 590 tries, by sequentially truncating section 3) of the URL, to access from the remote server 30 other pages connected with the requested page. For example, if the URL received from the browser 70 is:

http://www.xyz.com/index/page.htm then, in response to a page not found error from the remote server 30, the error handler may try to access http://www.xyz.com/index.htm,
http://www.xyz.com/page.htm,
http://www.xyz.com/index/

In particularly preferred embodiments of the present invention, the control logic 590 also tries different file extensions from the file extension store 580 in case a typographical error has been made in entry of the URL to the browser 70. For example, if the URL received from the browser 70 is:

http://www.xyz.com/index/page.html then, in response to a page not found error from the remote server 30, the error handler may try to access http://www.xyz.com/index/page.htm If, at 520, the control logic 590 fails to obtain alternative pages from the remote server 30 then, at 540, the control logic 590 sends a corresponding text message back to the browser 70 for display to the user (eg: "Unable to find alternative pages at www.xyz.com"). If, at 470, the control logic 590 isa able to obtain alternative pages from the remote server 30 then, at 530, the control logic 590 sends a text message back to the browser 70 for display to the user listing pages available from the remote server 30 as hypertext links from which the user can select an alternative.

Examples of the present invention have been hereinbefore described with reference to single remote server 20 in the interests of simplicity of explanation. However, it will be appreciated that the present invention equally applicable where there is a plurality of remote servers connected to the internet 10.

By way of summary, in the embodiments of the present invention hereinbefore described there is provided an error handler for a proxy server computer system which error handler receives a universal resource locator from a remote user terminal, accesses from a computer network a data file identified by the universal resource locator for supply to the user terminal, automatically modifies the universal resource locator in response to detection of a failure by the accessing means to access the data file, determines if a data file identified by the modified universal resource locator is accessible to the user terminal, and returns variable data indicating the error and offering remedial options to the user.

What is claimed is:

1. An error handler for a proxy server computer system, the error handler comprising: means for receiving a universal resource locator from a remote user terminal;

means for accessing from a computer network a data file identified by the universal resource locator for supply to the user terminal;

means for automatically modifying the universal resource locator in response to detection of a failure by the accessing means to access the data file; and, means for determining if a data file identified by the modified universal resource locator is accessible to the user terminal.

2. An error handler as claimed in claim 1, comprising means for reporting to the user terminal that the data file identified by the modified universal resource identifier is accessible.

3. An error handler as claimed in claim 1, comprising a protocol store storing a plurality of protocols for insertion in the universal resource locator.

4. An error handler as claimed in claim 1, comprising a server name store storing a plurality of server names for insertion in the universal resource locator.

5. An error handler as claimed in claim 1, comprising a file extension store storing a plurality of file extensions for insertion in the universal resource locator.

6. A proxy server computer system comprising: memory means; a central processing unit; first network adapter means for connecting the proxy server to a remote user terminal; second network adapter means for connecting the proxy server to a network of server computer systems; a bus architecture interconnecting the memory means and the central processing unit, the first network adapter means and the second network adapter means, and an error handler comprising: means for receiving a universal resource locator from a remote user terminal; means for accessing from a computer network a data file identified by the universal resource locator for supply to the user terminal;

means for automatically modifying the universal resource locator in response to detection of a failure by the accessing means to access the data file; and, means for determining if a data file identified by the modified universal resource locator is accessible to the user terminal.

7. A method for handling errors in a proxy server computer system comprising: receiving a universal resource locator from a remote user terminal; accessing from a computer network a data file identified by the universal resource locator for supply to the user terminal; automatically modifying the universal resource locator in response to detection of a failure by the accessing process to access the data file; and, determining if a data file identified by the modified universal resource locator is accessible to the user terminal.

8. A method as claimed in claim 7, comprising reporting to the user terminal that the data file identified by the modified universal resource identifier is accessible.

9. A method as claimed in claim 7, comprising storing a plurality of protocols for insertion in the universal resource locator.

10. A method as claimed in claim 7, comprising storing a plurality of server names for insertion in the universal resource locator.

11. An method as claimed in claim 7, comprising storing a plurality of file extensions for insertion in the universal resource locator.

* * * * *